United States Patent
Lai et al.

[11] Patent Number: 5,925,718
[45] Date of Patent: Jul. 20, 1999

[54] PROCESS FOR PREPARING POLYHYDROXYSTYRENE DERIVATIVES

[75] Inventors: Long-Li Lai, Taichung; Ting-Chung Liu, Hsinchu; Teu-Yu Lin, Hsinchu Chen, all of Taiwan

[73] Assignee: Industrial Technology Research Institute, Hsinchu, Taiwan

[21] Appl. No.: 08/865,907

[22] Filed: May 30, 1997

Related U.S. Application Data

[30] Foreign Application Priority Data

Dec. 5, 1997 [TW] Taiwan ................................. 86106322

[51] Int. Cl.$^6$ ...................................................... C08F 8/18
[52] U.S. Cl. .................................... 525/359.4; 525/328.8; 525/383; 525/386
[58] Field of Search ............................... 525/359.4, 383, 525/386

[56] References Cited

U.S. PATENT DOCUMENTS

| | | | |
|---|---|---|---|
| 3,879,328 | 4/1975 | Jones | 525/386 |
| 4,775,730 | 10/1988 | Gupta | 526/326 |
| 5,015,558 | 5/1991 | Ochi et al. | 525/359.4 |

FOREIGN PATENT DOCUMENTS 0634696  1/1995  European Pat. Off. .

*Primary Examiner*—Bernard Lipman
*Attorney, Agent, or Firm*—W. Wayne Liauh

[57] ABSTRACT

The present invention provides a process for preparing a polyhydroxystyrene derivative, comprising adding polyhydroxystyrene to an alkaline alcohol solution to form a homogeneous polyhydroxystyrene solution; and reacting the polyhydroxystyrene solution with an ester to obtain the polyhydroxystyrene derivative. The obtained polyhydroxystyrene derivative is suitable for use as the resin component of a photoresist.

15 Claims, No Drawings

PROCESS FOR PREPARING POLYHYDROXYSTYRENE DERIVATIVES

BACKGROUND OF THE INVENTION

1. Field of the Invention

The present invention relates to a process for preparing a polyhydroxystyrene derivative, and more particularly to a process for preparing polyhydroxystyrene derivatives by using an alkaline alcohol solution as the solvent to dissolve polyhydroxystyrene in order to allow the polyhydroxystyrene to react with an ester in a homogeneous system.

2. Description of the Prior Art

A typical photoresist composition includes a resin, a photoacid generator, an inhibitor, and other additives. An ideal photoresist composition should meet the following requirements such as the good resolution, photo-sensitivity, etching resistance, adhesion, thermal stability, film uniformity and the processibility. Since the resin is the major component in a photoresist, it has important influence on the above-mentioned properties, and particularly, it is the key factor for the enhanced ability of the etching resistance, adhesion, and film uniformity.

Generally speaking, since copolymers of polyhydroxystyrene have the low absorption at a wavelength of the 248 nm and the good thermal stability, they are often used as the resin components in a photoresist. Generally, there are two methods to prepare copolymers (or derivatives) of polyhydroxystyrene. One is the direct polymerization of two different monomers. For example, U.S. Pat. No. 4,775,730 disclosed the direct polymerization of the styrene derivative with another alkene derivative, and then the resultant copolymer was then subsequently hydrolyzed to produce the desired product. The reaction is shown in formula (III):

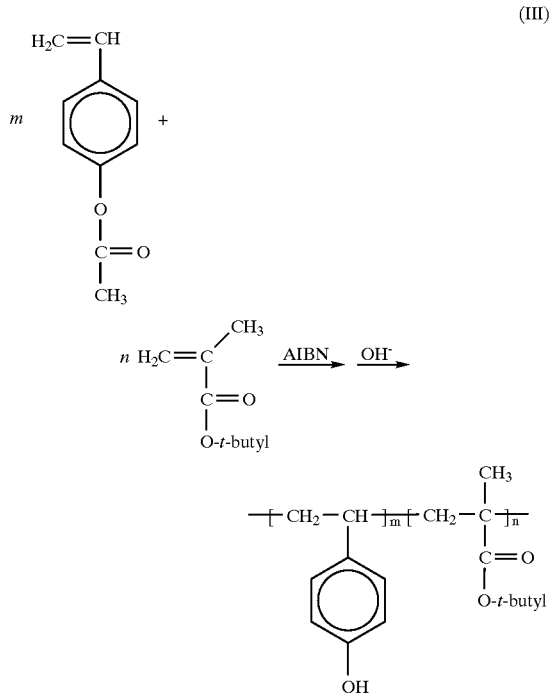

(III)

J. Polym. Sci.: Part A; Polym. Chem. Ed. 1986, 24, 2971, however, disclosed that two different styrene monomers are polymerized and a functional group is then selectively decomposed. The reaction is shown in formula (IV):

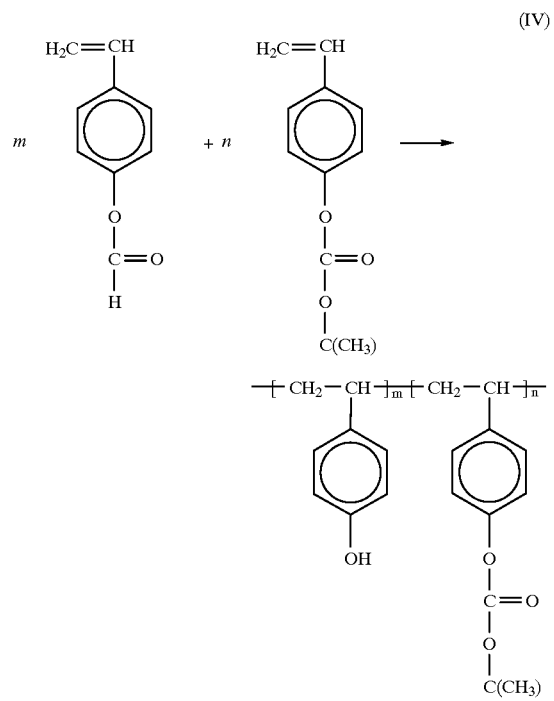

(IV)

Another way to prepare a polyhydroxystyrene copolymer involves using the polyhydroxystyrene as a starting material to allow polyhydroxystyrene reacting with an ester reagent. For example, in European Patent 0634696, polyhydroxystyrene is dissolved in tetrahydrofuran (THF), potassium t-butoxide [KOC(CH$_3$)$_3$] is then added, and then the mixture is allowed to react with di(t-butyl)dicarbonate to obtain a polyhydroxystyrene derivative. However, under such conditions, the potassium salt of the polyhydroxystyrene is not dissolved in THF. Therefore, the subsequent reaction of polyhydroxystyrene with di(t-butyl)dicarbonate is conducted in a non-homogeneous system. The overall reaction is as shown in formula (V):

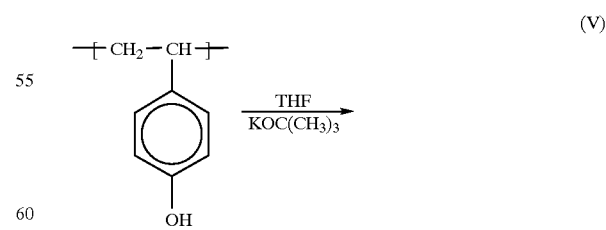

(V)

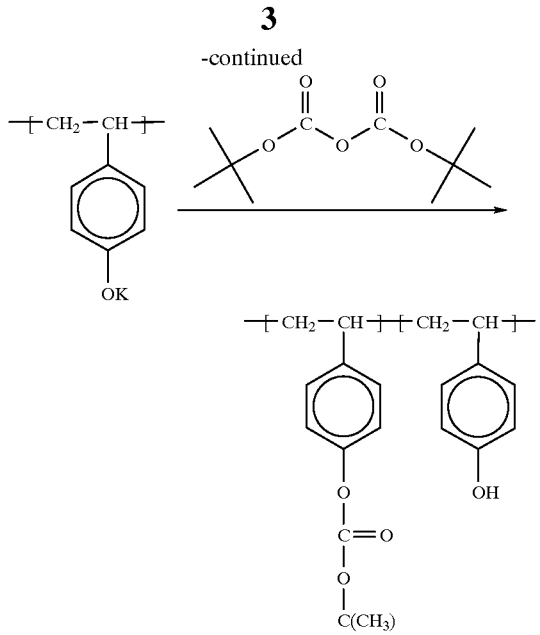

In a brief, the conventional processes for preparing a polyhydroxystyrene derivative either involve a complicated synthetic procedure or are rather time-consuming, and since the reaction is conducted in a non-homogeneous system, the functionalized extent of each polyhydroxystyrene molecule differs greatly, thus the quality of the product is not easily controlled.

SUMMARY OF THE INVENTION

The object of the present invention is to solve the above-mentioned problems and to provide a easy process for preparing a polyhydroxystyrene derivative. The present invention is to use a special solvent system to allow the reaction to be conducted in a homogeneous way, thus the polyhydroxystyrene as a starting material is completely dissolved in the reaction system, and the functionalized extent of each polyhydroxystyrene molecule will not differ greatly from each other, so that the quality of the product can be effectively controlled. Moreover, the used solvent possesses a very low toxicity, and the reaction is conducted at room temperature; no heating, refluxing, or low temperature apparatuses are needed for this kind of reaction. Therefore, the process of the present invention is simpler, time-saving, and possesses the high safety and commercial value.

To achieve the above-mentioned object, according to the present invention, the process for preparing a polyhydroxystyrene derivative comprises:

(a) adding polyhydroxystyrene to an alkaline alcohol solution to form a homogeneous polyhydroxystyrene solution,
   wherein the alkaline alcohol solution is obtained by mixing an alkaline reagent and an alcohol; and
(b) reacting the polyhydroxystyrene solution with an ester having the following formula (I) to obtain the polyhydroxystyrene derivative:

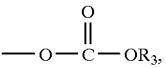

wherein $R_1$ is selected from the group consisting of F, Cl, Br, and

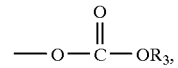

wherein $R_3$ is a hydrocarbon group having from 1 to 8 carbon atoms; and
   wherein $R_2$ is a hydrocarbon group having from 1 to 8 carbon atoms.

DETAILED DESCRIPTION OF THE INVENTION

According to the present invention, the starting material used for preparing a polyhydroxystyrene derivative is a commercially available polyhydroxystyrene. Polyhydroxystyrene is added to an alkaline alcohol solution and then thoroughly stirred to form a homogeneous polyhydroxystyrene solution. The so-called alkaline alcohol solution is obtained by mixing an alkaline reagent and an alcohol. All the alkaline/alcohol combinations which are capable of dissolving polyhydroxystyrene are suitable for use in the present invention.

Subsequently, the polyhydroxystyrene solution is allowed to react with an ester for a period of time. Water is added to precipitate the product, and the polyhydroxystyrene derivative is then obtained by filtration and drying.

Using the above-mentioned alkaline/alcohol solution system to synthesize the polyhydroxystyrene derivative, when the OH group is functionalized at a certain ratio, the product may precipitate out. Therefore, in order to obtain a polyhydroxystyrene derivative with a higher functionality ratio, after the reaction of the polyhydroxystyrene solution with the ester, an organic solvent may be added to dissolve the product, and, the ester reagent may be added again to provide adequate reactants, so as to allow the unreacted OH group of the polyhydroxystyrene to be further functionalized. Thus the functionalized extent of the final product can be increased. Suitable organic solvents include all kinds of solvents which are capable of dissolving the polyhydroxystyrene derivative. A representative example is N,N-dimethylformamide (DMF).

The alkaline reagent suitable for use in the present invention is a compound of an alkaline metal or an basic compound containing nitrogen atom. The compound of the alkaline metal can be a hydroxide or an alkoxide of the alkaline metal. Representative examples include sodium hydroxide, sodium methoxide, sodium ethoxide, sodium t-butoxide, potassium hydroxide, potassium methoxide, potassium ethoxide, and potassium t-butoxide.

The basic compound containing nitrogen atom suitable for use in the present invention is selected from the group consisting of

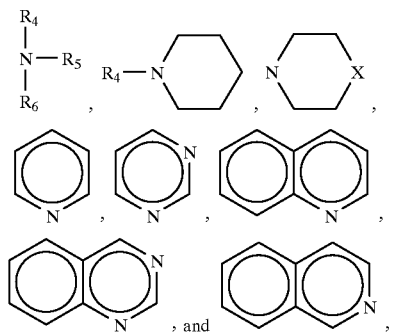

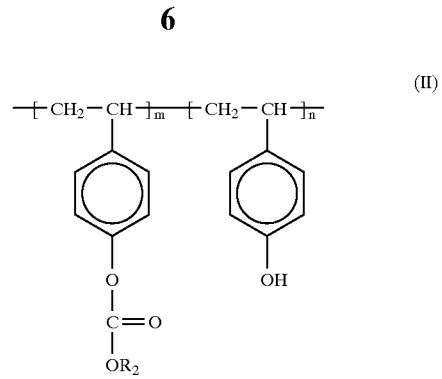

wherein $R_4$, $R_5$, $R_6$ is selected from the group consisting of H and a hydrocarbon group having from 1 to 4 carbon atoms, and X is either O or N. The representative examples of such nitrogen-containing basic compounds include trimethylamine and triethylamine.

The alcohol suitable for use in the present invention can be an alcohol having from 1 to 6 carbon atoms. Representative examples include methanol, ethanol, and isopropanol.

The ester reagent suitable for use in the present invention possesses the structure as shown by formula (I):

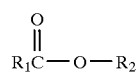
(I)

wherein $R_1$ is selected from the group consisting of F, Cl, Br, and

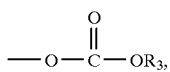

wherein $R_3$ is a hydrocarbon group having from 1 to 8 carbon atoms, preferably a hydrocarbon group selected from the group consisting of alkyl, phenyl, benzyl, substituted alkyl, substituted phenyl, and substituted benzyl having from 1 to 8 carbon atoms, wherein $R_2$ is a hydrocarbon group having from 1 to 8 carbon atoms, preferably a hydrocarbon group selected from the group consisting of alkyl, phenyl, benzyl, substituted alkyl, substituted phenyl, and substituted benzyl having from 1 to 8 carbon atoms.

When $R_1$ of the ester is F, Cl, or Br, the preferable examples of the ester are ethylchloroformate or phenylchloroformate. When $R_1$ of the ester is

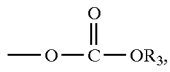

the preferable example of the ester is di(t-butyl)dicarbonate.

According to the above-mentioned process of the present invention, the obtained polyhydroxystyrene derivative possesses the structure as shown by formula (II):

wherein $R_2$ is a hydrocarbon group having from 1 to 8 carbon atoms, preferably a hydrocarbon group selected from the group consisting of alkyl, phenyl, benzyl, substituted alkyl, substituted phenyl, and substituted benzyl having from 1 to 8 carbon atoms.

The substituted phenyl may contain one or two substituted groups. Similarly, the substituted benzyl may also contain one or two substituted groups. The substituted groups can be alkyl, alkoxy, or halogen, for example, methyl, ethyl, propyl, methoxy, ethoxy, propoxy, fluorine, chlorine, or bromine.

According to the following examples of the present invention, $R_2$ can be ethyl, t-butyl, or phenyl.

In the formula (II), the ratio of m/m+n is between 0 and 1, preferably between 0.05 to 0.95, that is, indicating that the partially functionalized extent of polyhydroxystyrene is between 5% and 95%.

According to one aspect of the present invention, the present invention uses a special solvent system to allow the reaction to be conducted in a homogeneous way, so that the result (e.g., functionalized extent) of each polyhydroxystyrene molecule will not differ from each other greatly. Moreover, the used solvent possesses a very low toxicity, and the reaction is conducted at room temperature; no heating, refluxing, or low temperature apparatuses are needed for this kind of reaction. Therefore, the process of the present invention is simpler, and possesses the high safety and commercial value.

Since the polyhydroxystyrene derivative obtained from the present invention has a low absorption value at a wavelength of the 248 nm, and has the excellent thermal stability, it is suitable for use as a resin component of the 248 nm photoresist. Therefore, according to the present invention, a photoresist composition is provided, which comprises the polyhydroxystyrene derivative synthesized from the process of the present invention, 1–10 weight percent of a photoacid generator, and 5–30 weight percent of a dissolution inhibitor, based on the weight of the polyhydroxystyrene derivative.

The acid generators suitable for use in the present invention can be a diaryl iodonium salt, a triaryl sulfonium salt, sulfonylhydroxyimide, or derivatives thereof. Other suitable acid generators can be those used in European Patent 0634696. The dissolution inhibitor can be any compound containing an acid labile functional group, with a molecular weight under 1000.

The following examples are provided to illustrate the process and the advantages of the present invention more fully without limiting its scope, since numerous modifications and variations will be apparent to those skilled in the art.

EXAMPLES 1–5

Preparation of the polyhydroxystyrene solution in an alcohol 2.8 g of potassium hydroxide was added to a flask containing 300 mL of ethanol. After completely stirring, 6.0 g of polyhydroxystyrene was added and further stirred at room temperature for about 1 hour until the solution became clear. In addition to potassium hydroxide and ethanol, other alkaline/alcohol systems can also be used to dissolve polyhydroxystyrene. Table 1 lists the suitable alkaline/alcohol systems which can dissolve the polyhydroxystyrene.

TABLE 1

| Example | Solvent | Alkaline reagent |
|---------|---------|------------------|
| 1 | Ethanol | Potassium hydroxide |
| 2 | Ethanol | Sodium methoxide |
| 3 | Ethanol | Triethylamine |
| 4 | Methanol | Sodium methoxide |
| 5 | Isopropanol | Triethylamine |

EXAMPLES 6–9

Preparation of the polyhydroxystyrene derivative 0.4 to 1.0 equivalent of di(t-butyl)dicarbonate, ethylchloroformate, or phenylchloroformate was added to the polyhydroxystyrene solution in an alcohol solution system obtained from one of Examples 1–5. After stirring for 6 hours, the mixture was concentrated under reduced pressure to remove part of the solvent. The resultant mixture was treated by addition of 100–500 mL of water, and then acidification with a trace of acetic acid, it was then filtered, and dried to obtain the desired products 1–4. The reaction scale, the weight of the obtained product, and the equivalent ratio of the ester reagent are shown in Table 2.

TABLE 2

| | | | Product | | |
|---|---|---|---|---|---|
| Example | Ester reagent | No. | weight (g) | Scale (moles) | Equivalent number |
| 6 | Di(t-butyl)dicarbonate | 1 | 23.0 | 0.2 | 0.45 |
| 7 | Di(t-butyl)dicarbonate | 2 | 37.8 | 0.2 | 0.8 |
| 8 | Ethylchloroformate | 3 | 8.0 | 0.05 | 1.0 |
| 9 | Phenylchloroformate | 4 | 8.0 | 0.05 | 1.0 |

EXAMPLE 10

5.6 g of potassium hydroxide was added to a flask containing 800 mL of ethanol. After completely stirring, 12.0 g of polyhydroxystyrene was added and stirred at room temperature for about 1 hour until the solution became clear. 0.8 equivalent of di(t-butyl)dicarbonate was added to the solution and further stirred for about 6 hours. Subsequently, 100 mL of N,N-dimethylformamide was added to increase the solubility of the resulting mixture, and 0.4 equivalent of di(t-butyl)dicarbonate was added to provide adequate amount of reactants. The mixture was stirred for 6 hours, then followed by addition of 100 mL of water, filtration, and drying under vacuum to obtain product 5 (20.3 g).

The products (polyhydroxystyrene derivatives) obtained from the above examples have a general formula as shown below

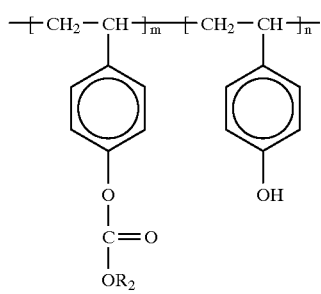

$R_2$ and the ratio of m/m+n for each product are shown in Table 3.

TABLE 3

| Product | $R_2$ | m/m + n | Instrument for analyzing m/m + n |
|---------|-------|---------|----------------------------------|
| 1 | t-Butyl | 38.9% | TGA |
| 2 | t-Butyl | 69.3% | TGA |
| 3 | Ethyl | 70.1% | NMR |
| 4 | Phenyl | 66.5% | NMR |
| 5 | t-Butyl | 92.5% | TGA |

The spectroscopic data of products 1–5 were analyzed by $^1$H-NMR and are listed as follows:
Products 1, 2, and 5:
(CDCl$_3$, 200 MHz): 1.55(9H, s, 3Me), 6.50(2H, s, b, Ar), 6.85(2H, s, b, Ar).
Product 3:
(CDCl$_3$, 200 MHz): 1.38(3H, s, b, Me), 4.31(2H, s, b, CH$_2$), 6.53(2H, s, b, Ar), 6.88(2H, s, b, Ar).
Product 4:
(CDCl$_3$, 200 MHz): 6.48(2H, s, b, Ar), 6.96(2H, s, b, Ar), 7.15–7.41(5H, m, Ph).

What is claimed is:
1. A process for preparing a polyhydroxystyrene derivative, comprising:
   (a) adding polyhydroxystyrene to an alkaline alcohol solution to form a homogeneous polyhydroxystyrene solution,
   wherein the alkaline alcohol solution is obtained by mixing an alkaline reagent and an alcohol; and
   (b) reacting the polyhydroxystyrene solution with an ester having the following formula (I) to obtain the polyhydroxystyrene derivative:

wherein $R_1$ is selected from the group consisting of F, Cl, Br, and

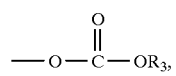

wherein $R_3$ is a hydrocarbon group having from 1 to 8 carbon atoms,
   wherein $R_2$ is a hydrocarbon group having from 1 to 8 carbon atoms.

2. The process as claimed in claim 1, wherein the alkaline reagent is selected from the group consisting of a compound of an alkaline metal and a basic compound containing nitrogen atom.

3. The process as claimed in claim 2, wherein the compound of the alkaline metal is selected from the group consisting of a hydroxide and an alkoxide of the alkaline metal.

4. The process as claimed in claim 3, wherein the compound of the alkaline metal is selected from the group consisting of sodium hydroxide, sodium methoxide, sodium ethoxide, and sodium t-butoxide.

5. The process as claimed in claim 3, wherein the compound of the alkaline metal is selected from the group consisting of potassium hydroxide, potassium methoxide, potassium ethoxide, and potassium t-butoxide.

6. The process as claimed in claim 2, wherein the basic compound containing nitrogen atom is selected from the group consisting of

wherein $R_4$, $R_5$, $R_6$ are selected from the group consisting of H and a hydrocarbon group having from 1 to 4 carbon atoms, and X is either O or N.

7. The process as claimed in claim 6, wherein the basic compound containing nitrogen atom is either trimethylamine or triethylamine.

8. The process as claimed in claim 1, wherein the alcohol is an alcohol having from 1 to 6 carbon atoms.

9. The process as claimed in claim 8, wherein the alcohol is selected from the group consisting of methanol, ethanol, and isopropanol.

10. The process as claimed in claim 1, wherein $R_2$ is selected from the group consisting of alkyl, phenyl, benzyl, substituted alkyl, substituted phenyl, and substituted benzyl having from 1 to 8 carbon atoms.

11. The process as claimed in claim 1, wherein $R_3$ is selected from the group consisting of alkyl, phenyl, benzyl, substituted alkyl, substituted phenyl, and substituted benzyl having from 1 to 8 carbon atoms.

12. The process as claimed in claim 10, wherein $R_1$ of the ester is selected from the group consisting of F, Cl, and Br.

13. The process as claimed in claim 12, wherein the ester is either ethylchloroformate or phenylchloroformate.

14. The process as claimed in claim 10, wherein $R_1$ of the ester is

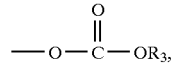

15. The process as claimed in claim 14, wherein the ester is di(t-butyl)dicarbonate.

* * * * *